W. M. LUTHER.
FRUIT EVAPORATOR.
APPLICATION FILED JAN. 25, 1913.
1,132,019.
Patented Mar. 16, 1915.
2 SHEETS—SHEET 1.
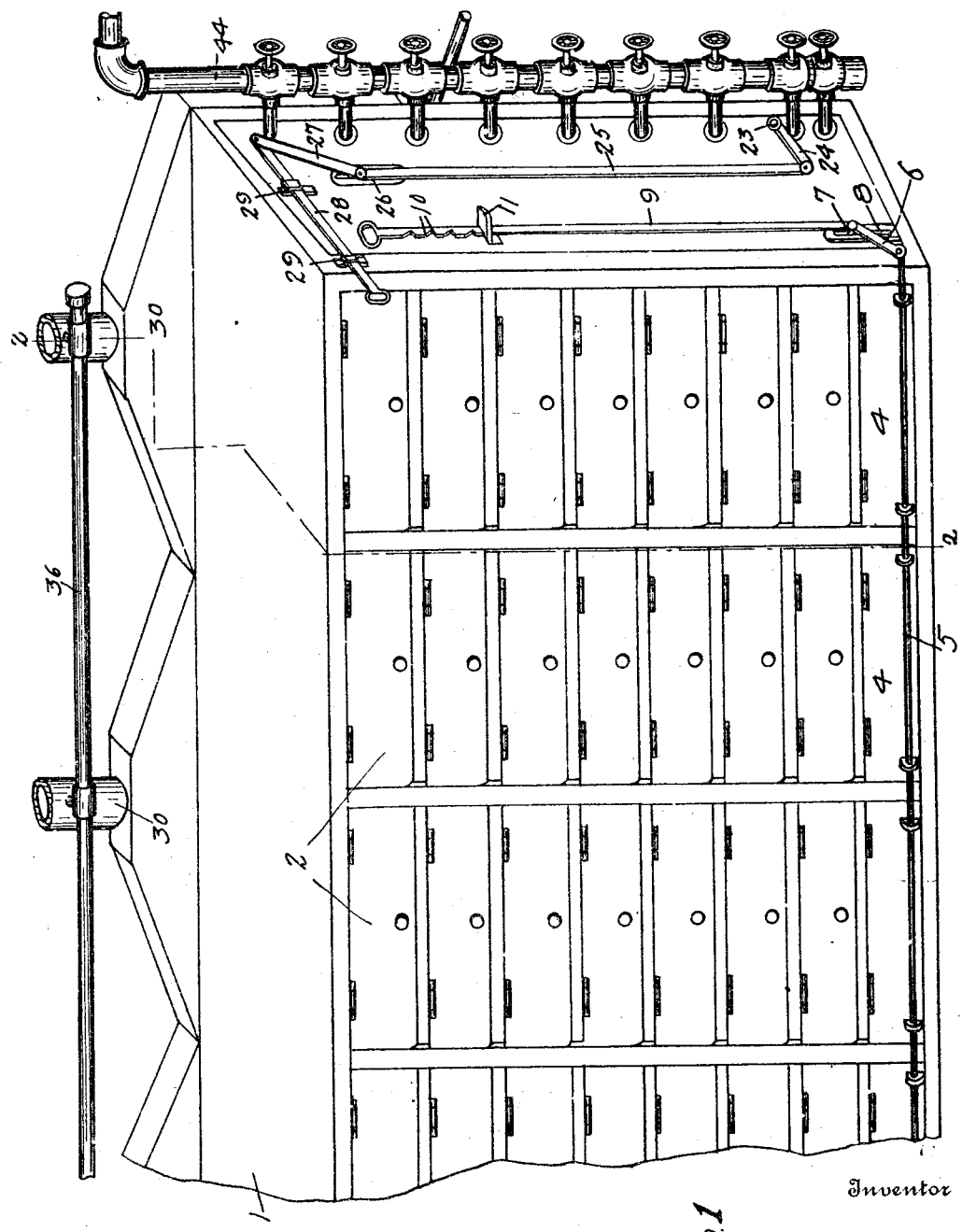
Witnesses
Harold E. Scantling
Wallock Czarnecki
Inventor
William M. Luther
By
Herbert E. Smith
Attorney

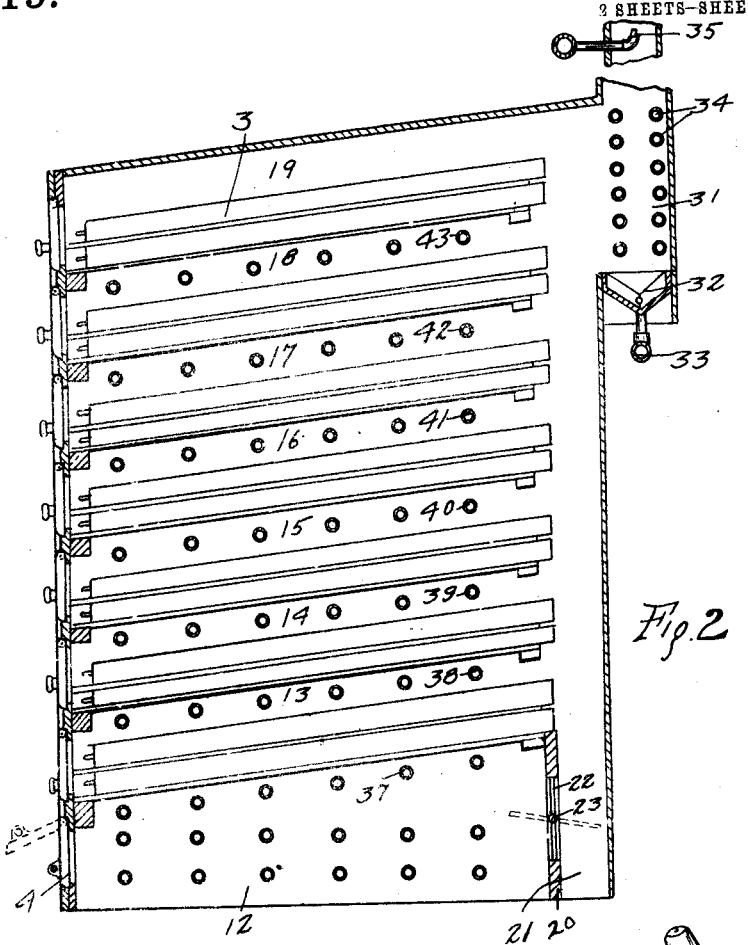
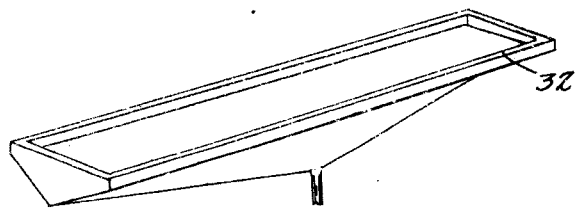
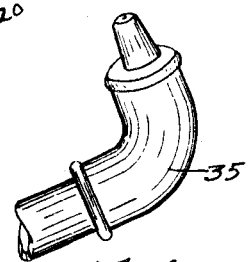

UNITED STATES PATENT OFFICE.

WILLIAM M. LUTHER, OF SPOKANE, WASHINGTON.

FRUIT-EVAPORATOR.

1,132,019.      Specification of Letters Patent.     Patented Mar. 16, 1915.

Application filed January 25, 1913. Serial No. 744,084.

*To all whom it may concern:*

Be it known that I, WILLIAM M. LUTHER, a citizen of the United States, residing at Spokane, in the county of Spokane and State of Washington, have invented new and useful Improvements in Fruit-Evaporators, of which the following is a specification.

My invention relates to improvements in fruit evaporators and it is one of the objects of my invention to provide a casing in which fruit trays are disposed in superposed and suitably spaced relation with respect to each other, there being an independent heater for each tray.

It is a further object of my invention to so arrange the inlet and outlet for the supply of air and the egress of steam as to obtain a natural draft, and to supplement this natural draft, I provide a forced outlet draft which may be effected by a pressure or so arranged as to induce a discharge of air and steam.

A further object of my invention is to provide a bypass for excess air so that the proper ratio or proportion of air and steam can be maintained and quickly regulated.

Other features of novelty of my invention will be more fully described in connection with the accompanying drawings, and will be more particularly pointed out in and by the appended claims.

In the drawings:—Figure 1 is a perspective view illustrating one embodiment of my invention. Fig. 2 is a sectional view on line 2—2 of Fig. 1. Fig. 3 is a perspective view of a condensation tray. Fig. 4 is a perspective view of a jet fitting for producing an induced egress draft.

Like characters of reference designate similar parts throughout the different figures of the drawings.

As illustrated, the device of my invention includes a casing 1 provided with a plurality of doors 2. Trays 3 are supported in the casing in superposed relation, and in suitably spaced relation with respect to each other, and the trays are arranged adjacent the doors, as clearly shown in Fig. 2.

A feature of my invention consists in arranging the trays in a slanting or inclined position, the purpose and function of which will hereinafter more fully appear.

A plurality of ingress dampers 4 are disposed at the bottom of the casing 1 to control ingress draft thereto. The dampers 4 may be hinged to the casing and they are shown connected with a rod 5 which latter is operated from a link 6. The link 6 is provided with an extension 7 which slides in a vertical guide 8 so that when the extension 7 is moved downwardly the rod 5 will be forced outwardly to open the dampers 4. An operating bar 9 is connected with the link 6 and is provided with notches 10 adapted to engage a suitable stop 11, so that the dampers can be opened to any desired extent within the range of action of the hereinbefore described operating means.

The disposition of the trays in the casing serves to provide superposed chambers which are designated at 12, 13, 14, 15, 16, 17, 18 and 19. The chamber 12 is the lowermost chamber and a partition 20, divides the casing so as to provide a bypass or excess passage or chamber 21. It will be noted by reference to Fig. 2 that the trays do not extend throughout the depth of the casing and therefore each of the chambers opens into the bypass 21 at the rear end of the trays, or at those ends opposite the ends adjacent the doors 2. An excess or bypass valve 22 is disposed in an opening in the partition 20 so as to either shut off or permit flow of air and steam from the chamber 12 through the bypass 21, the valve affording means of regulating the passage of excess air from the chamber 12. The valve 22 is mounted upon a valve stem 23 which carries an arm 24 on the exterior of the casing 1. A link 25 is pivoted to the arm and is slidably mounted in a guide 26 to move up and down vertically. A link 27 is connected with the link 25 and with an operating bar 28 slidable in guides 29. As the operating bar 28 is moved forwardly or rearwardly the valve 22 is swung to a position corresponding to the adjustment of the bar 28.

The casing 1 is provided with a plurality of stacks or outlets 30 and the rear of the casing is provided with a condensation outlet chamber 31 communicating with the entire area of the interior of the casing, the chamber 31 being preferably offset rearwardly with respect to the body of the casing 1. At the bottom of the chamber 31 I provide a condensation tray or collector 32 having a suitable outlet at 33. Pipes 34, suitably supplied with cold water, are disposed in the chamber 31, above the tray 32.

In the stacks 30 I provide a jet fitting 35 communicating with a suitable source of supply of pressure fluid from a pipe 36 with the jet directed upwardly so as to provide an induced egress draft.

The several chambers are provided with steam pipes 37, 38, 39, 40, 41, 42 and 43, as shown in Fig. 2. Each set of pipes is connected, as shown in Fig. 1, independently, with a main steam supply pipe 44 so that each tray will have an independent supply of steam, which may be of any desired temperature. The inclination of the trays toward the outlet or egress provides for the passage of saturated air from beneath each tray to the bypass 21. This prevents the saturated air in one chamber from passing into the next chamber and condensing on the fruit. The positive egress draft also serves to cause a positive flow of the saturated air through the outlet.

If air is admitted by the dampers 4 in excess of the desired ratio or proportion, the excess air may be passed, or a portion thereof passed through the partition 20 direct to the bypass 21. This arrangement provides for a suitable quantity of air for the uppermost chamber 19, and at the same time avoids the necessity of having an excess of air in chamber 12 in order to provide chamber 19 with its due proportion of air. The steam passing upwardly into the condensation chamber 31 strikes the cold pipe 34 and condenses into the tray 32 where it is carried off in any suitable manner. By operating the evaporator with the ingress damper 4 closed and steam or air turned on and passing through the jets 35, a partial vacuum is caused in the evaporator which quickly extracts the water from the fruit, vegetables, or other matter contained therein.

While I have herein shown and described one specific embodiment of my invention, I do not wish to be limited thereto except for such limitations as the claims may import.

I claim:—

1. A fruit evaporator comprising in combination, a casing provided with a bypass flue extending in substantially a vertical direction and having an outlet connected with said flue, a plurality of superposed spaced trays arranged in said casing so as to form with the sides of the casing a plurality of separate pockets communicating with said flue, and heating coils disposed between said trays.

2. A fruit evaporator comprising in combination, a casing having an air inlet and an air outlet, the latter provided with a condensing chamber, a plurality of trays in said casing, means for supplying heat to said casing between said trays, and means in said chamber for condensing the steam at said outlet, substantially as described and means for producing a forced draft at the outlet.

3. A fruit evaporator comprising in combination, a casing having a downwardly and forwardly disposed air inlet and a rearwardly and upwardly disposed outlet, a plurality of trays disposed between said inlet and outlet and extending rearwardly in said casing toward but not to the rear wall of the casing to form a bypass extending upwardly past said trays to the outlet, said trays being disposed in spaced relation with respect to each other to form chambers therebetween, a partition dividing off the lowermost chamber from said bypass, and a valve in said partition, substantially as described.

4. A fruit evaporator comprising in combination, a casing having an air inlet and an air outlet, said outlet being provided with a condensing chamber, a plurality of trays in said casing, means for supplying heat to said casing between said trays, means in said chamber for condensing the steam at said outlet, means for restricting the flow of air at said inlet, and means for producing a forced draft through said outlet.

5. A fruit evaporator comprising in combination, a casing provided with a bypass flue extending substantially in a vertical direction and having an outlet connected with said flue, a plurality of superposed spaced trays arranged in said casing so as to form separate chambers therein, said chambers communicating with said flue, heating coils disposed between said trays, and a damper for regulating the amount of gas passing through said bypass flue.

In testimony whereof I affix my signature in the presence of two witnesses.

WILLIAM M. LUTHER.

Witnesses:
HAROLD E. SCANTLEBURY,
WALLOCK CZARNECKI.